Dec. 22, 1953   R. K. CHAMBERLAIN   2,663,384
SELF-ENERGIZING SINGLE-DISK BRAKE
Filed Aug. 8, 1951   2 Sheets-Sheet 1

INVENTOR.
RICHARD K. CHAMBERLAIN
BY
R. L. Miller
ATTORNEY

Dec. 22, 1953  R. K. CHAMBERLAIN  2,663,384
SELF-ENERGIZING SINGLE-DISK BRAKE

Filed Aug. 8, 1951  2 Sheets-Sheet 2

INVENTOR.
RICHARD K. CHAMBERLAIN
BY

*R. L. Miller*
ATTORNEY

Patented Dec. 22, 1953

2,663,384

UNITED STATES PATENT OFFICE 2,663,384

SELF-ENERGIZING SINGLE-DISK BRAKE

Richard K. Chamberlain, Akron, Ohio, assignor to Wingfoot Corporation, Akron, Ohio, a corporation of Delaware Application August 8, 1951, Serial No. 240,896

3 Claims. (Cl. 188—73)

This invention relates to a mechanism to effect braking action between two relatively movable elements, and, more particularly, is concerned with a spot-type, single-disc brake which is self-energizing.

The advantages of the self-energizing principle in which the momentum of the moving element is utilized to provide a portion of the braking pressure are well known. The self-energizing principle has been used to advantage particularly in the automobile brake field. While the use of the principle with spot-type brake designs has been heretofore proposed, no known design has successfully utilized the self-energization principle commercially.

Moreover, the use of the self-energizing principle is usually attended with possibilities and conditions of brake grabbing and even locking which are, obviously, highly undesirable except in special brake installations.

It is the general object of this invention to provide a disc type brake which requires less force on the part of the operator, and is characterized by long life, ruggedness, general simplicity, and braking effectiveness.

Another object of this invention is to provide a single-disc, spot-type brake which is partially self-energizing to provide a maximum of braking torque with a minimum of brake application effort.

Another object of this invention is the provision of a self-energizing brake which is responsible to the operator's control.

Another object of this invention is to provide a brake of the type described which can be actuated by mechanical or hydraulic means, or a combination of the two as may be desirable in a parking brake arrangement.

Another object of this invention is the provision of a multiple or single disc brake having self-energizing characteristics without grabbing or locking.

These and other objects of this invention which will become apparent as the description proceeds are achieved by the provision of a self-energizing brake assembly including a member, a disc mounted to rotate relative to the member, a torque plate secured to the member, and a shoe-supporting bracket secured to the torque plate. The shoe-supporting bracket extends on either side of the disc and hingedly supports a pair of brake shoes in parallel relationship on either side of the disc with the ends of the brake shoes remote from the pivot points extending beyond the outer periphery of the disc. A plug of friction material is secured to each of the brake shoes on the surface of the shoes adjacent the disc and intermediate of the ends of the shoes. A tension member extends between the ends of the shoes remote from the pivot points. Hydraulic motor means is provided in association with the tensioning member to impart a clamping action to the brake shoes to clamp the disc between the friction plugs. As hereinafter more fully described, the positioning of the pivot points is such that self-energization then occurs in the desired degree.

For a better understanding of the invention, references should be had to the accompanying drawings wherein.

Figure 1:
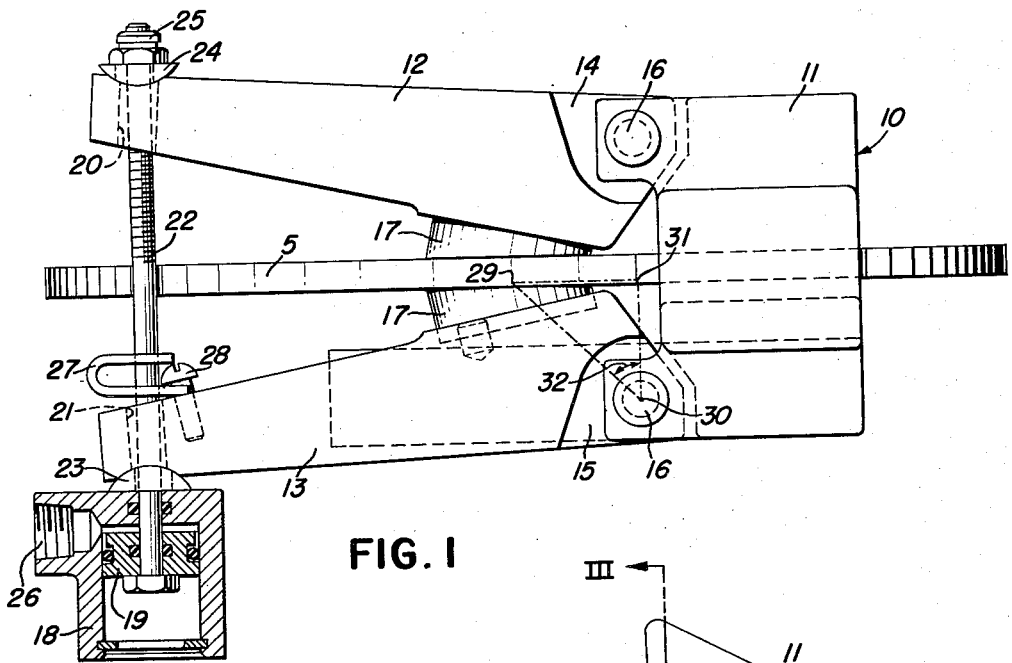
Fig. 1 is a top elevational view partly in section of an improved brake of the invention.

With specific reference to the form of the invention illustrated in the drawings, the numeral 1 indicates generally an axle or an axle housing. In one specific application of the brake of the invention, the back wheel brakes are mounted on the axle housing, which rotatably receives an axle, and the front wheel brakes are secured to a torque flange on a nonrotative axle which rotatably supports a wheel. Rotatably carried with or rotatably mounted on the axle is a hub 2 which mounts a wheel 3 supporting a drop-center or other rim 4. A brake disc 5 is formed integrally with or is secured to turn with the wheel. The fastening of the wheel 3 to the hub 2 is accomplished, for example, by bolt means 6 in the manner shown, such means being spaced circumferentially.

Surrounding the axle or housing 1 is a torque plate or yoke 7 which is secured to the axle by circumferentially spaced bolts 8. The torque plate includes a radially directed arm portion which is adapted to support the brake mechanism indicated as a whole by the numeral 10. The brake mechanism 10 includes a shoe-supporting bracket 11 which extends on either side of the disc 5 and is supported from the torque plate 7 by means of bolts 9.

The bracket 11 hingedly supports a pair of brake shoes or arms 12 and 13 which are carried on either side of the disc 5, as best shown in Fig. 1. The brake shoes 12 and 13 are provided with tongue portions 14 and 15 respectively, which are hingedly secured to the supporting bracket by means of pins 16. Thus, the brake shoes are pivotally supported for movement in a plane perpendicular to the plane of the disc 5.

Secured to the inwardly directed face of each brake shoe is a plug of friction material 17 which is faced off at an angle to slidably engage the disc in opposed relationship. It will be noted that the angle on the face of the friction plugs 17 is in the direction so that as the surfaces of the plugs wear, the surfaces become more parallel with the surfaces of the shoes 12 and 13, and the shoes themselves move into more parallel positions with the discs. By drawing the outer ends of the brake shoes together, the disc is clamped between the plugs of friction material.

To draw the outer ends of the brake shoes together to squeeze the disc between the friction plugs 17, hydraulic means is provided which includes a cylinder portion 18 and a piston 19. The outer ends of the brake shoes 12 and 13 project beyond the periphery of the disc 5 and are provided with holes 20 and 21 respectively. A tension member in the form of a bolt 22 is secured to the piston 19 and extends through the holes 20 and 21. A washer 23 having one face thereof spherically contoured and seating in the hole 21 provides a self-aligning seat for the cylinder 18. A similar washer 24 provides a seat for the adjusting nut 25 which threadably engages the bolt 22 to secure the hydraulic motor means and tensioning member together in a unit.

It will be evident that in operation, when fluid under pressure is applied through the opening 26 into the cylinder 18, the piston 19 is moved relative to the cylinder, causing the ends of the brake shoes to be drawn together. This movement effects the desired braking action by squeezing the disc 5 between the friction plugs 17. As the friction material wears, infrequent adjustments may be made by means of the nut 25 so that engagement of the friction plugs with the disc 5 occurs with the piston 19 at a point intermediate the extremes of the stroke provided by the cylinder 18.

Figure 2:
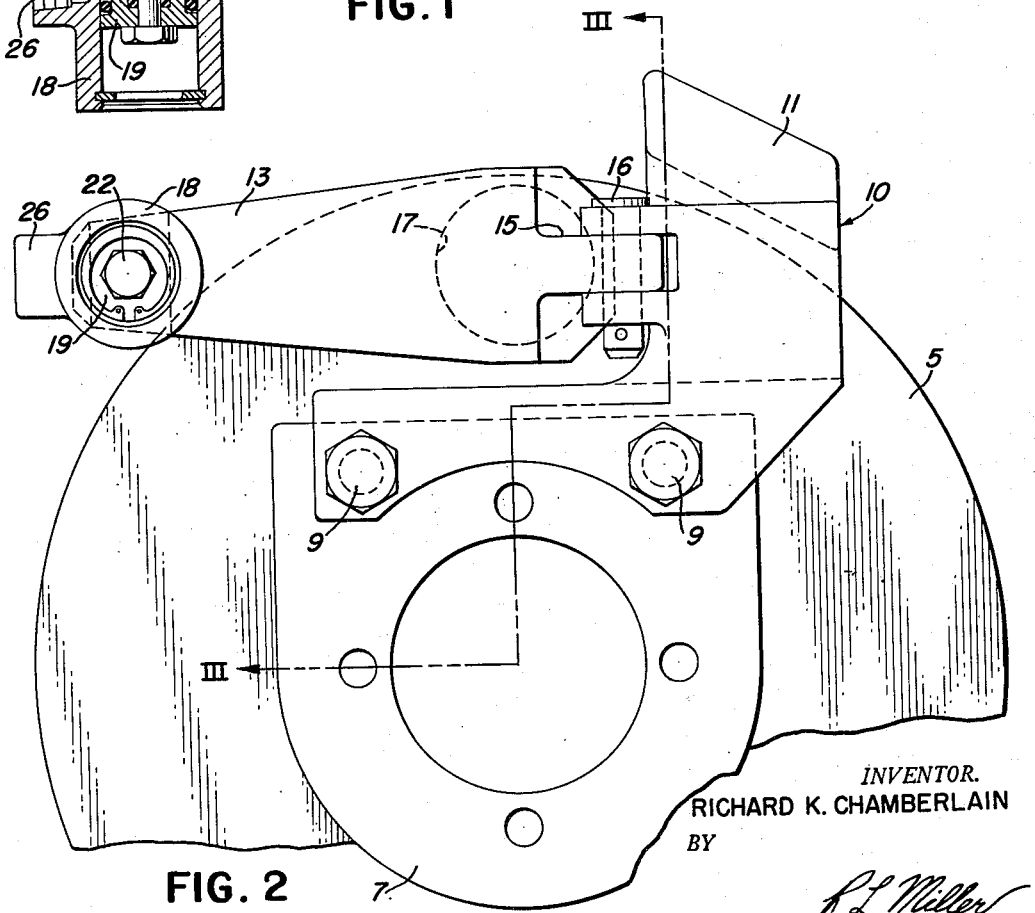
Fig. 2 is a side elevational view showing the mounting plate for the brake assembly.
Figure 3:
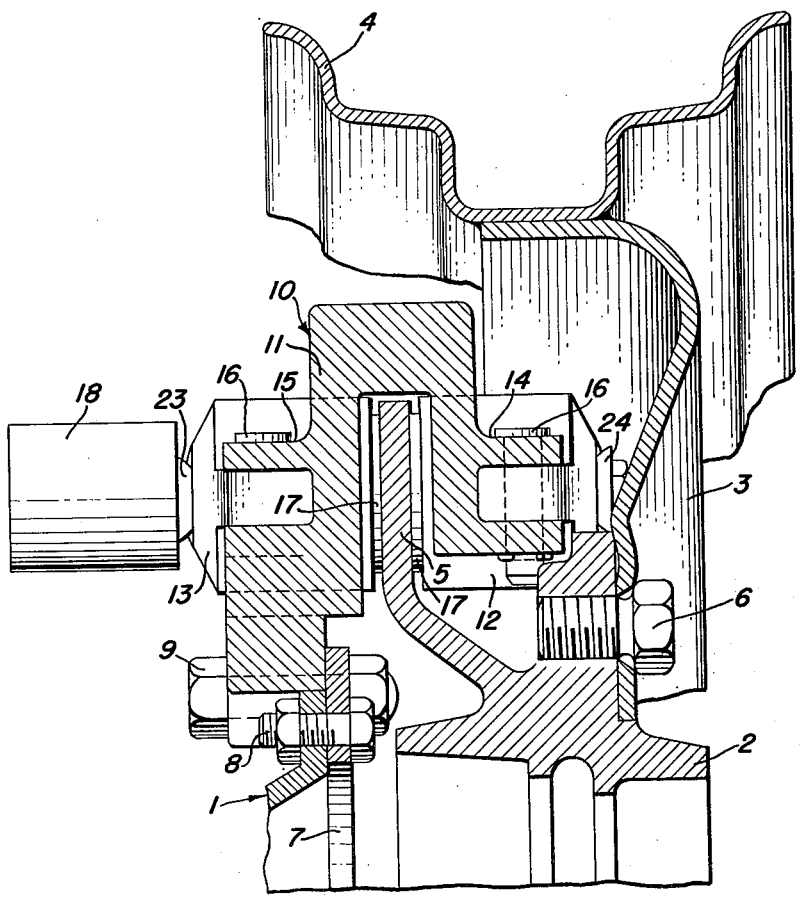
Fig. 3 is a cross-sectional view taken substantially on the line III—III of Fig. 2.

Rotation of the disc between the plugs 17 produces a frictional force which tends to rotate the brake shoes about their pivotal axes. Assuming normal rotation of the disc is clockwise as viewed in Fig. 2, the frictional force tends to rotate the brake shoes in the same direction as that produced by the brake force applied by the hydraulic motor means. Thus, the total braking effort is increased by the frictional force produced by the frictional engagement between the plugs 17 and the rotating disc 5. The amount of braking action developed by this self-energization is a function of (a) the coefficient of friction, (b) the perpendicular distance between the face of the disc and the pivotal axis of each brake shoe, and (c) the distance from the plugs 17 to the plane containing the pins 16. By careful selection of these distances in substantially the ratio shown, good self-energizing is obtained without grabbing or locking. More specifically, with conventional coefficients of dry friction for the plugs of friction material, a ratio of about 1 to 1 should be used, i. e., the distance from the pivot pin to the disc should be about equal to and not more than about plus or minus 30% of the distance between the plugs and the plane containing the pivot pins.

Stated another way, the tangent of angle 32 of right triangle 29, 30, and 31 (line 29—30 passes from pivot pin 16 through the center of plug 17 and line 30—31 passes from pivot pin perpendicular to disc, and line 31—29 is along the face of the disc) should be about one and not more than plus or minus 30% with usual friction coefficients.

In general, it can be stated that the self-energization of the brake is such that braking pressure increases from between about 12% and about 25% are obtained, and within these limits grabbing and chattering of the brake is avoided. Of course, in certain installations it may be desirable to have the brake lock in and the self-energizing pressures can be increased by decreasing the tangent of angle 32. With a tangent of one for angle 32, with usual friction coefficients a gain of about 17% is obtained.

One feature of the invention is a spring-actuated means for maintaining the clearance at a minimum between the friction plugs and the brake disc when the brake pressure is released, regardless of the wear of the friction material. To this end, a U-shaped spring 27 is provided having holes through the end portions thereof through which the tensioning member 22 passes. One end of the U-shaped spring 27 is anchored to the brake shoe 13 as by a screw 28. Action of the U-shaped spring is such that when the ends of the brake shoes are drawn together, the free end of the spring strikes the head of screw 28 and the tensioning member 22 slides through the holes of the spring 27. However, when the brake pressure is released, spring 27 tends to open up so that the tensioning member 22 binds in the holes in the spring preventing the member 22 from moving relative to the spring. Thus, separation of the brake shoes on release of the braking force is limited by the springing action of the spring 27.

From the above description, it will be evident that the objects of the invention have been achieved by the provision of a self-energizing brake of the single-disc, spot-type construction. The brake combines the long-life, simplicity, and ruggedness that characterize the single-disc spot-type brake with the improved braking torque of the self-energizing principle. The brake is readily adaptable to mechanical or hydraulic operation.

While certain representative embodiments and details have been shown for the purpose of illustrating the invention, it will be apparent to those skilled in this art that various changes and modifications may be made therein without departing from the spirit or scope of the invention.

What is claimed is:

1. A self-energizing brake assembly including a member, a disc mounted to rotate relative to the member, a torque plate secured to the member, a shoe supporting bracket secured to the torque plate, the bracket extending on either side of the disc, a pair of brake shoes, each shoe being pivotally secured to an opposite end of the bracket and supported thereby in slightly outwardly directed relationship from the points of pivotal support on either side of the disc, the ends of the brake shoes remote from the pivot points extending beyond the outer periphery of the disc, a tapered plug of friction material rigidly secured to each of the brake shoes on the surface of the shoes adjacent the disc, and intermediate of the ends of the shoes, the taper on the plug and the outwardly directed brake shoes resulting in the surfaces of the plugs being parallel with the faces of the disc, the plugs terminating short of the plane between the brake shoe pivots, a tension member pivotally secured to the end remote from the pivot of one of the shoes, said tension member extending through the corresponding end of the other brake shoe, and an hydraulic motor means having a piston and cylinder the cylinder of which engages the said other brake shoe and the piston of which is secured to said tensioning member whereby the motor means imparts a clamping action to the brake shoes to clamp the disc between the friction plugs, said disc being rotatable in the direction from the plugs of friction material toward the pivotal supports for the brake shoes.

2. A self-energizing brake assembly including a member, a disc mounted to rotate relative to the member, a shoe supporting bracket carried by said member, the bracket extending on either side of the disc, a pair of brake shoes, each shoe being pivotally secured to an opposite end of the bracket and supported thereby in substantially parallel relationship on either side of the disc, the ends of the brake shoes remote from the pivot points extending beyond the outer periphery of the disc, a plug of friction material secured to each of the brake shoes on the surface of the shoes adjacent the disc, and intermediate of the ends of the shoes, the plugs of friction material terminating short of the plane between the pivotal supports of the brake shoes, and means for moving the ends of the brake shoes remote from the points of pivotal support towards the disc, said disc being rotatable in the direction from the plugs of friction material toward the pivotal supports for the brake shoes.

3. A self-energizing brake assembly including a member, a disc mounted to rotate relative to the member, a shoe supporting bracket carried by said member, the bracket extending on either side of the disc, a pair of brake shoes, each shoe being pivotally secured to an opposite end of the bracket and supported thereby in outwardly inclined relationship on either side of the disc, the ends of the brake shoes remote from the pivot points extending beyond the outer periphery of the disc, a tapered plug of friction material secured to each of the brake shoes on the surface of the shoes adjacent the disc, and intermediate of the ends of the shoes, the taper of each plug and the outward incline of each shoe resulting in the face of the plug being parallel to the disc, and means for moving the ends of the brake shoes remote from the points of pivotal support towards the disc, said disc being rotatable in the direction from the plugs of friction material toward the pivotal supports for the brake shoes.

RICHARD K. CHAMBERLAIN.

References Cited in the file of this patent

UNITED STATES PATENTS

| Number | Name | Date |
|---|---|---|
| 1,995,135 | Williams et al. | Mar. 19, 1935 |
| 2,376,685 | Goepfrich | May 22, 1945 |
| 2,485,086 | Cagle | Oct. 18, 1949 |